US006258304B1

(12) United States Patent
Bahia

(10) Patent No.: US 6,258,304 B1
(45) Date of Patent: Jul. 10, 2001

(54) PROCESS OF MAKING LYOCELL FIBRE OR FILM

(75) Inventor: Hardev Singh Bahia, Coventry (GB)

(73) Assignee: Tencel Limited, Derby (GB)

( * ) Notice: Subject to any disclaimer, the term of this patent is extended or adjusted under 35 U.S.C. 154(b) by 0 days.

(21) Appl. No.: 09/380,951

(22) PCT Filed: Apr. 8, 1998

(86) PCT No.: PCT/GB98/01036

§ 371 Date: Sep. 10, 1999

§ 102(e) Date: Sep. 10, 1999

(87) PCT Pub. No.: WO98/46814

PCT Pub. Date: Oct. 22, 1998

(30) Foreign Application Priority Data

Apr. 11, 1997 (GB) .................................. 9707426

(51) Int. Cl.[7] .......................... B29C 67/20; D01D 5/247; D01D 5/36
(52) U.S. Cl. .................. 264/41; 264/49; 264/171.1; 264/187; 264/203; 264/211.16; 264/172.13
(58) Field of Search ............................. 264/41, 187, 203, 264/49, 211.16, 172.13, 171.1

(56) References Cited

U.S. PATENT DOCUMENTS

| 2,397,454 | 3/1946 | Woodward et al. | 18/54 |
|---|---|---|---|
| 4,434,160 | 2/1984 | Jeretin et al. | 424/180 |
| 5,695,375 | 12/1997 | Takemura et al. | 442/217 |
| 5,753,367 | 5/1998 | Takemura et al. | 428/372 |
| 6,019,925 * | 2/2000 | Diamantoglou et al. | 264/203 |

FOREIGN PATENT DOCUMENTS

| 046167 | 2/1982 | (EP) . |
|---|---|---|
| 537370 | 6/1941 | (GB) . |
| 539442 | 9/1941 | (GB) . |
| 579081 | 7/1946 | (GB) . |
| 580941 | 9/1946 | (GB) . |
| 801326 | 9/1958 | (GB) . |
| 1367378 | 9/1974 | (GB) . |
| 2121069 | 12/1983 | (GB) . |
| WO 87/00561 | 1/1987 | (WO) . |

OTHER PUBLICATIONS

Chemical Abstracts, vol. 125, No. 14, Abstract No. 170809, Omori A et al., "Disperse dye–dyeable organic solvent–based cellulosic fibers, their manufacture, and fabrics", p. 165 (Sep. 30, 1996) XP002074207 (abstract) & JP 08170224.

Chemical Abstracts, vol. 127, No. 26, Abstract No. 359903, Omori A et al., "Manufacture of Fibrillatable Synthetic Fibers," p. 528 (Dec. 29, 1997) XP002074208 (abstract) & JP 09 302 520.

Abstract of Japanese Patent 66011680, Database WPI, Week 196800 B, Derwent Publications Ltd.

Translation of Japan 8–170224 (Jul. 2, 1996).

* cited by examiner

Primary Examiner—Leo B. Tentoni
(74) Attorney, Agent, or Firm—Howson & Howson

(57) ABSTRACT

Lyocell fibres contain elongated domains of polyester, polyamide or an olefin copolymer, the domains having an aspect ratio at least 1.5 and being aligned substantially parallel to the axis of the fibre. A process for the preparation of lyocell fibre or film by extruding a solution of cellulose in amine oxide through a spinneret or film die at elevated temperature via an air gap into an aqueous precipitation bath is characterised in that 0.1 to 60 wt % based on cellulose of a thermoplastic low-melting polymer is incorporated into the cellulose solution. A process for the preparation of a bicomponent fibre by extruding two polymers through a spinneret in side-by-side relationship at elevated temperature is characterised in that one of the polymers is a solution of cellulose in amine oxide and the other polymer is a molten thermoplastic polymer having a melting point above 25° C. but below the extrusion temperature.

9 Claims, No Drawings

PROCESS OF MAKING LYOCELL FIBRE OR FILM

FIELD OF THE INVENTION

This invention relates to modified lyocell fibre and film and to a process for the preparation of modified lyocell fibre or film. "Fibre" is used in this specification to include continuous filament yarns, tows of yarn for cutting into staple fibre and also staple Fibre formed from such a tow.

BACKGROUND ART

Lyocell fibre and film is produced by dissolving cellulose in a suitable solvent, for example a tertiary amine N-oxide such as N-methyl morpholine oxide mixed with water. A suitable method of manufacture is described in U.S. Pat. No. 4,416,698. The solution of cellulose in the amine oxide solvent, which is solid at ambient temperature, is extruded at a temperature of 95–1250° C. from a spinneret or film die through an air gap into a precipitation bath of water or dilute aqueous amine oxide, and the amine oxide solvent leaches into the bath, producing cellulose fibre or film.

JP-A-8-170224 discloses a biconstituent fibre of the islands-in-the-sea type in which the continuous "sea" component is a cellulose-type polymer spun from an organic solvent system and the "islands" are composed of a polymer dyeable by a disperse dye and are 0.01–34 μm in size and form 2–45% by weight of the fibre. The disperse dyeable polymer is for example a polyester such as polyethylene terephthalate, sulphonic acid-modified polyethylene terephthalate or polybutylene terephthalate.

GE-A-2121069 discloses cellulose-based (viscose rayon) fibres for the Production of nonwovens containing as mineral fillers barium sulphate, talcum, muskovite, or a mixture thereof, in an amount of from 15 to 60%, preferably 40 to 50%, of the total fibre mass, and, if desired, additionally hydrophobic, polymer or oligomer substances, such as polyethylene, polypropylene, polystyrene, polyacrylic acid ester, polyester, polytetrafluoroethylene or waxes, in an amount of from 1 to 60%, preferably 25 to 50%, of the total fibre mass. GB-A-2008126 discloses the use of polystyrene as a delustrant for viscose rayon fibres.

DISCLOSURE OF THE INVENTION

A process according to the in ention for the preparation of lyocell fibre or film by extruding a solution of cellulose in amine oxide through a spinneret or film die at elevated temperature via an air gas into an aqueous precipitation bath is characterised in that 0.1–60 wt % based on cellulose of a thermoplastic low-melting polymer is incorporated into the cellulose solution, the low-melting polymer having a melting point above 25° C. but below the extrusion temperature of the cellulose solution.

In the process of the invention, the thermoplastic low-melting polymer is in a melted state in the cellulose solution at the extrusion temperature and the melted polymer is aligned in the axial direction of the fibre or film as the solution is extruded. When fibre is extruded through a spinneret, the low-melting polymer generally forms particles or domains of aspect ratio at least 1.5 and usually at least 2 in the fiber.

The thermoplastic low-melting polymer should generally be sufficiently compatible with the cellulose solution that the polymer when molten does not agglomerate as a separate phase from the cellulose solution, but is is preferably not soluble either in amine oxide or in the solution of cellulose. One type of preferred low-melting polymer is a polyester.

In general, we have found that the presence of carboxylic acid groups in the low-melting polymer increases its compatibility with the cellulose solution, giving more thorough mixing of the cellulose and the low-melting polymer. For most uses, the polymer preferably has an acid value of at least 10, up to for example 50 or 100 or even 150. We also believe that a branched polymer structure may be advantageous. The melting point of the low-melting polymer is preferably at least 35° C. and up to 125° C., most preferably in the range 50 to 100° C., as measured by differential thermal analysis. The Tg of the polymer is preferably higher than 30° C. Examples of polyesters of this type having the required low melting point are formed from a mixture of aromatic dicarboxylic acids selected from isophthalic acid, terephthalic acid, and phthalic acid or anhydride, optionally with an aliphatic dicarboxylic acid such as adipic, succinic or sebacic acid, and one or more aliphatic diols such as neopentyl glycol, ethylene glycol, propylene glycol, propane-1,3-diol, butane-1,4-diol, butylene glycol or diethylene glycol. Branching can be introduced by a trifunctional reagent, for example trimellitic acid or anhydride or trimethylolprocane, glycerol or pentaerythritol. The required acid value can be obtained by using an appropriate excess of carboxylic acid-functional reagent. Such polyesters are sold for use in thermosetting powder coatings, for example under the Trade Marks "Alftalat 03258", "Uralac P2980" or "Grilesta V76-12".

Alternative thermoplastic low-melting polymers are polyamides, for example polyamides formed from fatty acid dimers and aliphatic diamines or the copolyamide sold under the Trade Mark "Griltex", or olefin copolymers, for example ethylene/vinyl acetate or ethylene/butylene/butyl acrylate copolymers, preferably containing a small amount of acrylic acid comonomer to give the preferred acid value.

Thus, according to another aspect of the invention lyocell fibre is characterised in that the fibre contains elongated domains of polyester, polyamide or an olefin copolymer, the domains having an aspect ratio of at least 1.5 and being aligned substantially parallel to the axis of the fibre.

The concentration of cellulose in the solution to be extruded (otherwise known as the spinning solution) is generally 12 to 20% by weight, preferably at least 14 or 15% up to 17 or 18% by weight. We have found that the thermoplastic low-melting polymer tends to reduce the viscosity and shear resistance of the spinning solution, as evidenced by reduction in back-pressure during spinning, so that the concentration of cellulose can be increased compared to extrusion (spinning) without added polymer. The spinning solution preferably contains water, usually in the range 5–50% by weight, with the remainder, generally 65–83% by weight, being amine oxide. The extrusion temperature is generally 95 to 125° C.

The low-melting polymer can be added to the cellulose solution at any of various points during its preparation. The polymer can for example be premixed with cellulose pulp, the pulp then being mixed with amine oxide and water to form the swirling solution. The polymer can alternatively be added, preferably in molten form, to a preformed cellulose solution. In a further alternative, a relatively high proportion of low-melting polymer is premixed wish a preformed cellulose solution, for example forming 10 to 50% by weight of the mixture. The pulp can then be used as a masterbatch to add the low-melting polymer to cellulose solution at the required level.

The cellulose solution containing a low-melting polymer can be extruded to form fibres using the same spinneret, or to form film using the same extrusion die, at the same temperature as is conventionally used for forming lyocell fibre or film.

The domains or particles of low-melting polymer are distributed uniformly throughout the fibre or film as a separate phase. When a carboxy-functional polyester is included as low-melting polymer in a lyocell spinning solution, for example, the polyester phase appears as particles or domains of length 70 to 1000 nanometres (nm) and diameter 30 to 400 nm. Polyesters of higher carboxyl content tend to produce fibres with relatively small polyester domains whereas polyesters of low carboxyl content tend to produce fibres having relatively large polyester domains. The polyester phase cannot usually be seen by optical microscopy but can be seen by electron microscopy at x9000 enlargement. Fibre inspection by electron microscope in cross-section shows apparently spherical particles but a longitudinal view shows that the polyester domains are elliptical. The polyester domains generally have an aspect ratio (ratio of length to diameter) of at least 1.5, usually between 2 and 4.

The level of low-melting polymer present in the fibre is generally 0.1 up to 30 or even 50 or 60% by weight based on cellulose. The presence of the elongated particles or domains of low-melting polymer gives rise to various effects depending on the concentration of low-melting polymer and on the type of low-melting polymer used.

If a low-melting polymer having no or a relatively low carboxylic acid content, for example of acid value below 50, particularly below 30, is used at concentrations of at least 3% by weight based on cellulose, up to 60%, for example 4 to 12%, by weight, lyocell fibres having an increased tendency to fibrillation are produced. Fibres most likely to fibrillate may be produced using low-melting polymers which are substantially non-acid-functional, for example polyester of acid value 1 to 5. Such fibres are desirable for use in many non-woven processes, for example wet laying or dry laying on papermaking machinery or hydroentanglement, since they give increased inter-fibre bonding (mechanical entanglement) and hence a paper or nonwoven fabric of increased strength, and also for use in filters.

Fibre or film containing 0.1 to 3 wt % of the low-melting polymer, particularly polyester, has been found to show improved dimensional stability compared to unmodified lyocell fibre and when formed into fabrics, particularly woven fabrics, to have improved crease resistance compared to fabrics of unmodified lyocell fibre.

When polyester is used as the low-melting polymer, the fibre or film produced is dyeable with disperse dyes. Levels of polyester as low as 0.1% by weight, for example 0.25 to 1.0% by weight, can be used as a tracer which is revealed on disperse dyeing, for example with Planil Blue BGFN, without affecting other properties of the lyocell fibre. Fibre or film containing above 1%, preferably above 2%, by weight polyester, for example 5 to 10% up to 30% by weight polyester, can be disperse dyed to produce reasonably deep shades, and film or fabric formed from the fibre can be transfer printed with disperse dyes. A marl effect is possible by blending standard lyocell fibres with the fibres of the invention. If the polyester is used at above 5% by weight based on cellulose, it is usually preferred for dyeing purposes that the polyester has a high acid value, for example at least 30 and preferably at least 60, so increase compatibility with the cellulose and avoid fibrillation. Polyesters of this high acid value are also dyeable by basic dyes, and lyocell fibres dyeable by basic dyes can thereby be produced. The fibres dye so readily with basic dyes that continuous filaments can be dyed on-line.

When polyamide is used as the low-melting polymer, the fibre or film produced is dyeable with disperse dyes or acid dyes.

The fibre containing low-melting polymer, particularly polyester, has self-lubricating properties so that it can be processed, for example staple fibre can be carded, without addition of any lubricant finish. The static friction between fibres is low and the dynamic friction is high, giving good web/sliver cohesion. This effect is achieved at levels of 0.3% by weight and above, up to for example 5% by weight. The preferred level of polyester to achieve this self-lubricating effect is 0.4 to 2% by weight. The fibre also retains a permanent soft handle and may have improved crimp retention. Fabrics containing the fibre have improved crease recovery.

The low-melting polymer can be used as a vehicle for introducing solid additives into lyocell fibre and film, for example pigments such as carbon black to make conductive fibre, barium sulphate to make radio-opaque fibre or pigment dyes which are used when very high colour fastness is required.

The low-melting polymer may be included in lyocell fibre simply for its ability to reduce spinning solution viscosity and shear resistance, allowing spinning of solutions of increased cellulose consent. This has advantages of increased throughput and reduced handling of amine oxide solvent per amount of fibre produced. The weight ratio of amine oxide to cellulose in the spinning solution can for example be reduced from 5.0 to 4.5 or below.

The fibre or film can be post-treated with a crosslinker for the low-melting polymer if the low-melting polymer is intended to give a permanent effect and there is a risk of its being removed from the fibre in use, for example by heating or hydrolysis. A carboxy-functional polymer can for example be treated with a crosslinking agent having epoxide groups or activated hydroxyl groups. Alternatively, the fibre can be treated with a crosslinking agent for the lyocell which will reduce fibrillation, for example a compound having acrylamido groups such as triacryloyl hexahydrotriazine disclosed in WO-A-94/09191. We have found that fibrillation can be reduced while retaining the dyeability imparted by the polyester.

In an alternative post-treatment, fibre containing domains of polyester or a carboxy-functional polymer, most preferably a carboxy-functional polyester, is treated with alkali, for example an aqueous solution of 1–10% by weight sodium hydroxide, to hydrolyse and dissolve the polyester or carboxy-functional polymer domains, leaving voids in the fibre. The resulting fibre has an attractive silky handle. The alkali post-treatment can be carried out on continuous filaments before cutting into staple fibre or on fibre, yarn or fabric.

Alternative fibres according to the invention can be produced by spinning lyocell and the low-melting polymer as a bicomponent fibre. Thus, the invention includes a process for the preparation of a bicomponent fibre by extruding two polymers through a spinneret in side-by-side relationship at elevated temperature, characterised in that one of the polymers is a solution of cellulose in amine oxide and the other polymer is a molten thermoplastic polymer having a melting point above 25° C. but below the extrusion temperature and in that the extrudate passes from the spinneret through an air gap into an aqueous precipitation bath. The low-melting thermoplastic polymer can be a polyester, polyamide or olefin copolymer, for example, and is preferably a carboxy-functional polymer, particularly a carboxy-functional polyester of acid value above 10 and preferably above 30, for example 50 to 100. The composition of the cellulose solution and the extrusion temperature are generally as stated above. The cellulose solution can also contain 0.1 to 60% by weight based on cellulose of a thermoplastic low-melting polymer as mentioned above. Bicomponent fibres have not previously been produced by spinning a polymer solution and a molten polymer in side-by-side relationship. We have found, surprisingly, that there is good adhesion between the lyocell and the polyester in the bicomponent fibres. The bicomponent fibres have the advantage that they are both absorbent (from the lyocell) and potentially adhesive by heating the thermoplastic fibre. They can for example be used as bonding fibres in the production of absorbent nonwovens.

The invention therefore includes a bicomponent fibre comprising two polymers in side-by-side relationship, characterised in that one of the polymers is cellulose and the other polymer is a thermoplastic polyester, polyamide or olefin copolymer of melting point in the range 25–125° C.

Alternatively, the cellulose solution containing a low-melting polymer can be used as one component of a bicomponent fibre such as a sheath/core or side-by-side bicomponent fibre, for example it can be used with unmodified lyocell as the other component or with polyester as the other component (particularly when the low-melting polymer is a polyester).

Lyocell fibre is spun through an air gap into a precipitation aqueous (spin) bath into which the amine oxide leaches. For the lyocell production process to be economically and environmentally sound, the amine oxide needs to be recovered from the spin bath and recycled. We have found that the low-melting polymer, particularly the polyester described above, does not leach out of the fibre into the spin bath and causes substantially no contamination of the spin bath or of the recycled amine oxide.

The invention is illustrated by the following Examples, in which parts, percentages and ratios are by weight.

EXAMPLE 1

Wood pulp was mixed at 100° C. for 5 minutes in a Z-blade mixer with a 3:1 amine oxide:water solution. "Alftalat 03258" carboxy-terminated saturated polyester resin of acid value about 30 and melting point 90° C. and having a branched structure, available from Hoechst AG, was added to the mixture at a level of 2.0% based on wood pulp. Mixing was carried out for a further 5 minutes at ambient pressure before vacuum was applied, gradually removing water from the mixture while mixing until a solution comprising 15.0% cellulose, 0.3% polyester, 74.7% amine oxide (N-methyl morpholine oxide) and 10.0% water was formed. This spinning dope was solidified by cooling (its melting point was about 60° C.), chipped and spun into fibre at 110° C. using an extruder feeding a 95-hole spinneret at 60 metres per minute. The filaments emerging from the spinneret passed through a 2 cm air gap into an aqueous spin bath containing 25% amine oxide. Amine oxide was leached from the filaments in the spin bath so that the cellulose was precipitated. The resulting tow of fibre was passed through a hot air chamber (100° C.) to dry the fibre and was collected by winding. The tow produced was of 1.7 decitex per filament and contained 2.0% polyester based on cellulose. As seen by electron microscopy, the polyester was present in the fibre as particles or domains elongated in the axial direction or the fibre. The polyester particles varied in length from 79 to 800 nm and in diameter from 44 to 400 nm. The particles generally had an aspect ratio of at least 1.5; most particles had an aspect ratio of between 2 and 3.

The tow was crimped by passing through a stuffer box and then cut into 38 mm staple fibre which could be carded on a No. 5 Platt cotton card without addition of any lubricant, producing a strong coherent sliver. The sliver was drafted and spun into yarn on ring spinning machinery. A fabric knitted from the yarn had a soft handle and was dyed to a uniform medium red shading using "Serisol Fast Rubine BD 200" disperse dye.

EXAMPLE 2

The procedure of Example 1 was repeated using 0.75% "Alftalat 03258" polyester based on cellulose. The staple fibre produced could be carded without addition of lubricant, as described in Example 1. The knitted fabric had a soft handle. The depth of shade achieved by disperse dyeing was low but was sufficient to act as a tracer, i.e. to distinguish it from other cellulose fibre by dyeing with disperse dyes. The tensile properties of the fibre were no different from those of standard lyocell fibre.

EXAMPLE 3

The procedure of Example 1 was repeated using 0.25% "Alftalat 03258" polyester. The staple fibre produced could be carded without addition of lubricant, although more dust and fly was generated than with the fibres of Examples 1 and 2. The fibre, and yarn and fabric formed from it, had a harsher handle than the fibre of Examples 1 and 2 (similar to standard lyocell fibre without lubricant). The polyester still acted as a tracer which could be revealed by disperse dyeing.

EXAMPLE 4

Fibre was produced as described in Example 1 but using 10.0% of the "Alftalat 03258" polyester.

The tow produced was cut into (5 mm) staple fibre. Cut fibre was placed a: 0.3% concentration in water in a disintegrater for 100,000 revs. The Canadian standard freeness (CSF) of the fibre was then measured and fibres were examined by microscope. Paper hand-sheets were prepared from the disintegrated fibres and were tested using TAPPI standard paper testing equipment.

The results in Table 1 below show the properties of paper made from the fibre of Example 4 (column headed "Biconstituent Fibre") compared to those of paper made from bleached 1.7 dtex lyocell fibre prepared under similar conditions but without "Alftalat 03258" polyester (column headed "Bleached Tencel")

TABLE 1

|  | Biconstituent Fibre | Bleached Tencel |
| --- | --- | --- |
| Bulk (cc/g) | 3.06 | 3.56 |
| Tensile Index (Nm/g) | 20.8 | 1.7 |
| Burst Index (MN/kg) | 2.42 | 0.76 |
| Tear Index (mNm$^2$/g) | 37.0 | 2.0 |
| Air resistance (secs) | 2.5 |  |
| CSF (mls) | 195 | 692 |

The low CSF of the disintegrated biconstituent fibre indicates a high level of fibrillation. This was confirmed by microscopic examination which showed that the fibre had a multitude of long thin fibrils. No evidence of cut fibre or detached fibrils was observed. The higher paper strength properties (tensile, burst and tear properties) of papers produced from the biconstituent fibres of the invention are due to the high level of fibrillation.

EXAMPLE 5

It was noted during the spinning processes of Examples 1 to 4 that the back pressure during spinning was low compared to the back pressure when spinning standard lyocell fibres from a spinning solution having the same cellulose concentration.

In Example 5 the process of Example 1 was repeated but the ratio of wood pulp to amine oxide/water was changed in the initial mixing step and mixing under vacuum was continued until more water had been removed, resulting in a spinning solution containing 16.4% cellulose, 0.33% polyester, 74.9% amine oxide and 8.4% water. This solution could be successfully spun into fibre; the back pressure during spinning was similar to that during spinning of standard lyocell from a solution containing 15.0% cellulose.

The fibre of Example 5 could be cut into staple, carded, spun, knitted and dyed with the same results as described in Example 1.

EXAMPLE 6

Fibre was produced using the procedure of Example 1 but using 30% based on wood pulp of a copolyester resin of acid value 72 and melting point 100° C. in place of the "Alftalat". The fibre produced comprised an intimate mixture of lyocell with polyester domains which were generally smaller than in the fibre of Example 1.

The fibre was kier dyed using 6% by weight Astrazone Black basic dye (a mixture of yellow, red and blue dyes) and dyed to an even black shade.

What is claimed is:

1. A process for the preparation of lyocell fibre or film by extruding a solution of cellulose in amine oxide through a spinneret or film die at elevated temperature via an air gap into an aqueous precipitation bath, thereby to form said fibre or film, characterised in that 0.1 to 60 wt % based on cellulose of a thermoplastic low-melting polymer is incorporated into the cellulose solution, the low-melting polymer having a melting point above 25° C. but below the extrusion temperature of the cellulose solution, whereby said low-melting polymer is in a melted state during said extrusion step and is aligned in the axial direction of said fibre or film as said solution is extruded.

2. A process according to claim 1, characterised in that the low-melting polymer has a melting point in the range 50 to 100° C.

3. A process according to claim 2, characterised in that the low-melting polymer is a polyester.

4. A process according to claim 2, characterised in that the low-melting polymer is a polyamide.

5. A process according to claim 2, characterised in that the low-melting polymer has a branched structure.

6. A process according to claim 2, characterised in that the low-melting polymer is a carboxy-functional polymer of acid value at least 10.

7. A process according to claim 6, characterised in that the low-melting polymer is a polyester of acid value at least 30 and the lyocell fibre or film produced is dyeable by disperse and basic dyes.

8. A process according to claim 3, characterized in that the fibre produced in the precipitation bath is treated with alkali to hydrolize and dissolve the polyester, producing a fibre containing voids and having a silky handle.

9. A process according to claim 6, characterized in that the fibre produced in the precipitation bath is treated with alkali to hydrolize and dissolve the carboxy-functional polymer, producing a fibre containing voids and having a silky handle.

* * * * *

UNITED STATES PATENT AND TRADEMARK OFFICE
CERTIFICATE OF CORRECTION

PATENT NO. : 6,258,304 B1
DATED : July 10, 2001
INVENTOR(S) : Hardev Singh Bahia It is certified that error appears in the above-identified patent and that said Letters Patent is hereby corrected as shown below:

Column 1,
Line 18, "95-1250°" should read -- 95-125° --;
Line 26, "34 μm" should read -- 3 μm --;
Line 31, "GE-A-2121069" should read -- GB-A-2121069 --;
Line 44, "inention" should read -- invention --;

Column 2,
Line 50, "5-50%" should read -- 5-15% --;
Line 58, "swirling" should read -- spinning --;
Line 61, "wish" should read -- with --;

Column 3,
Line 65, "so" should read -- to --;

Column 4,
Line 28, "consent" should read -- content --;

Column 6,
Line 2, "or" should read -- of --;
Line 42, "a:" should read -- at --.

Signed and Sealed this

Twenty-sixth Day of March, 2002

Attest:

*Attesting Officer*

JAMES E. ROGAN
*Director of the United States Patent and Trademark Office*